United States Patent [19]

Ohkumo et al.

[11] Patent Number: 5,035,219
[45] Date of Patent: Jul. 30, 1991

[54] METHOD FOR CONTROLLING IGNITION TIMING OF AN INTERNAL COMBUSTION ENGINE

[75] Inventors: Hiroya Ohkumo, Musashino; Shuji Miyama, Musashimurayama, both of Japan

[73] Assignee: Fuji Jukogyo Kabushiki Kaisha, Tokyo, Japan

[21] Appl. No.: 518,799

[22] Filed: May 4, 1990

[30] Foreign Application Priority Data

May 18, 1989 [JP] Japan ................................ 1-125135

[51] Int. Cl.$^5$ ............................................. F02P 5/15
[52] U.S. Cl. ................................................ 123/425
[58] Field of Search ................ 123/421, 424, 425, 435

[56] References Cited

U.S. PATENT DOCUMENTS

| | | | |
|---|---|---|---|
| 4,570,596 | 2/1986 | Sato | 123/421 |
| 4,691,678 | 9/1987 | Nagai | 123/425 |
| 4,694,801 | 9/1987 | Nagai | 123/425 |
| 4,726,339 | 2/1988 | Nagai | 123/425 |
| 4,736,723 | 4/1988 | Nagai | 123/425 |
| 4,766,545 | 8/1988 | Nagai | 123/425 X |
| 4,844,027 | 7/1989 | Nakamura | 123/425 |

*Primary Examiner*—Tony M. Argenbright
*Attorney, Agent, or Firm*—Martin A. Farber

[57] ABSTRACT

An ignition timing controlling system is provided for calculating an ignition timing based on a basic ignition timing, a learning correcting quantity including a large correcting quantity and a small correcting quantity. A temporary correcting quantity having a small value is stored in a memory at starting of the engine, and increased in an advance direction until knocking of the engine occurs. The increased temporary correcting quantity is compared with the large correcting quantity and either of the quantities is selected as a proper correcting quantity. An ignition timing is calculated based on the selected quantity.

6 Claims, 15 Drawing Sheets

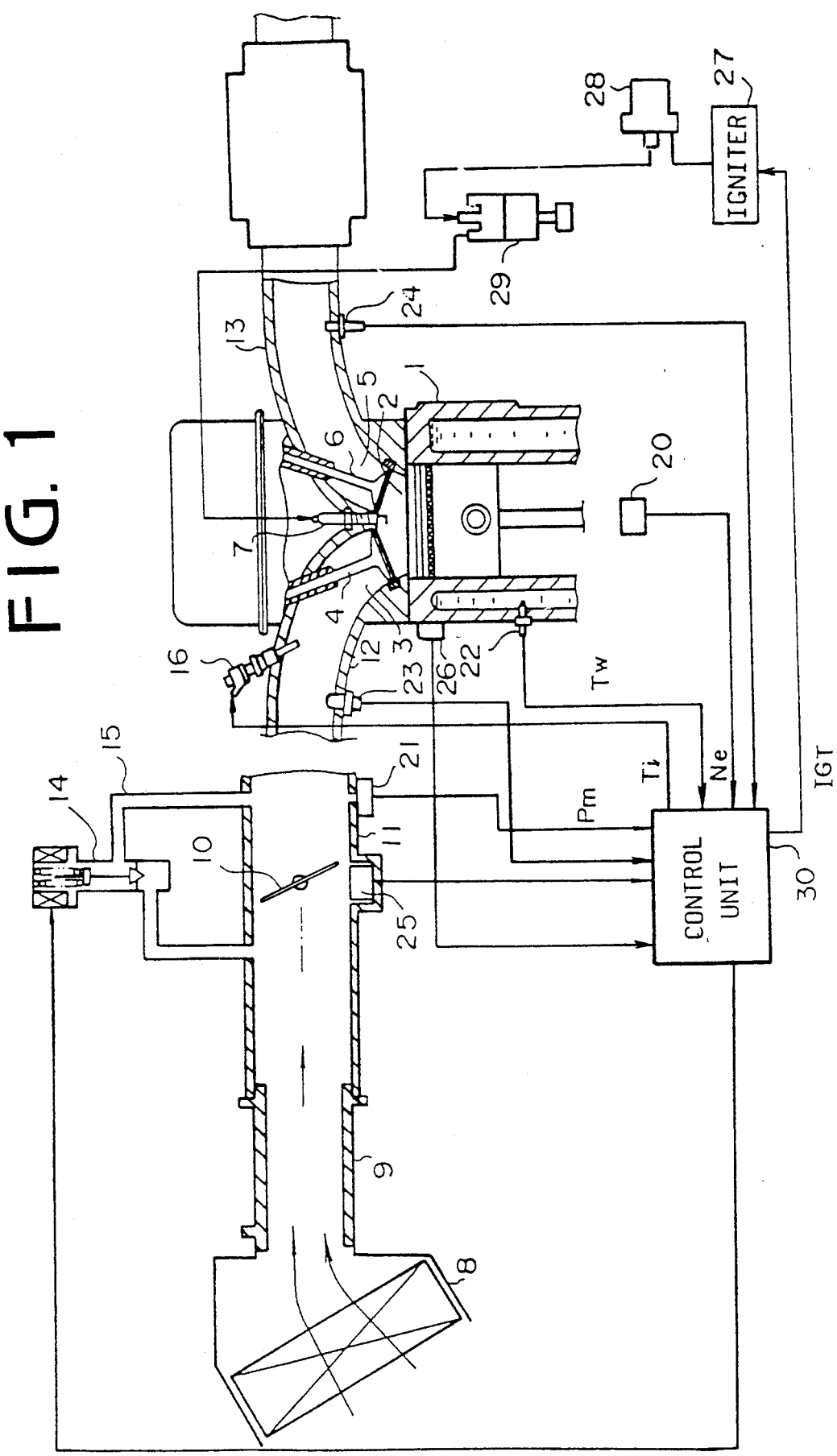

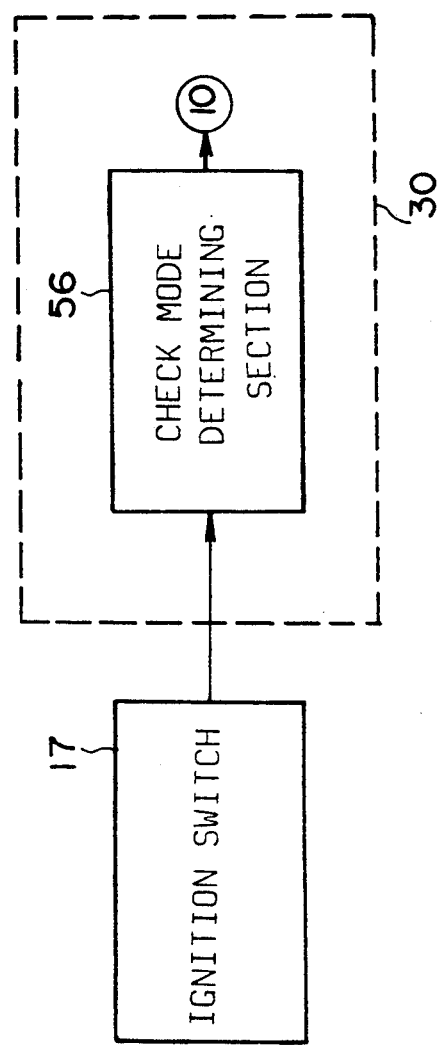

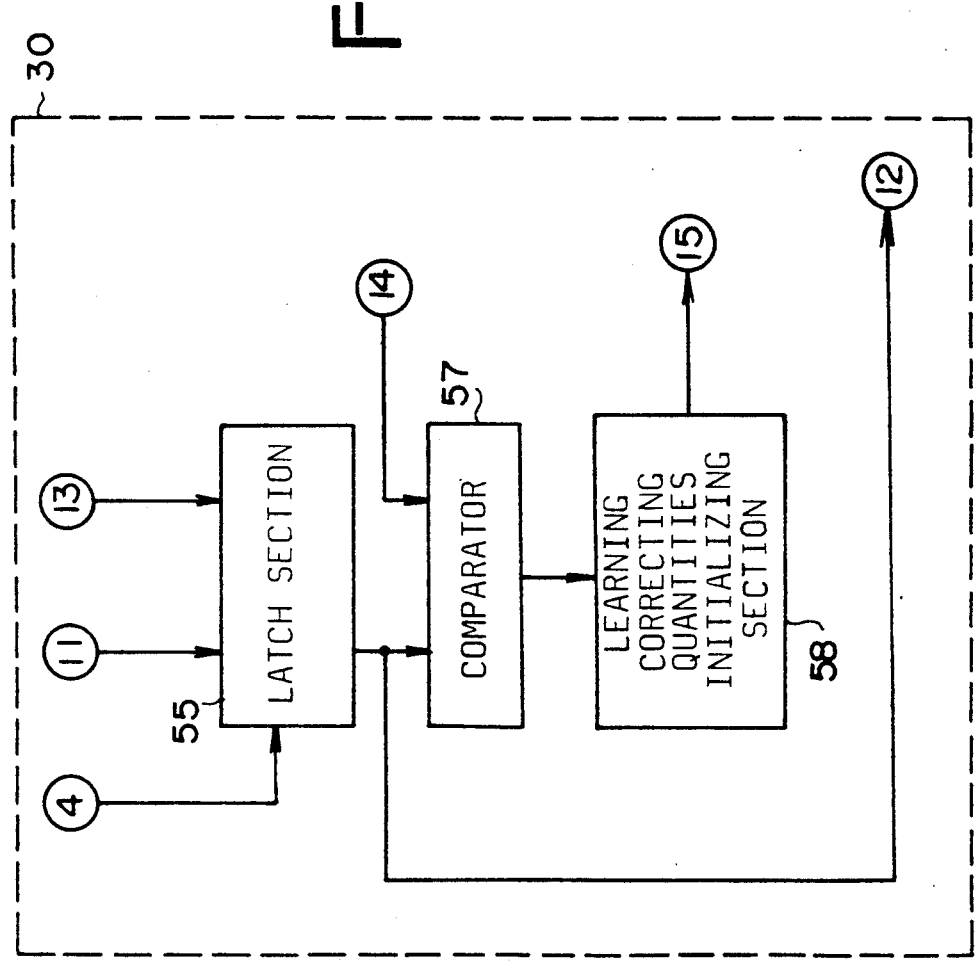

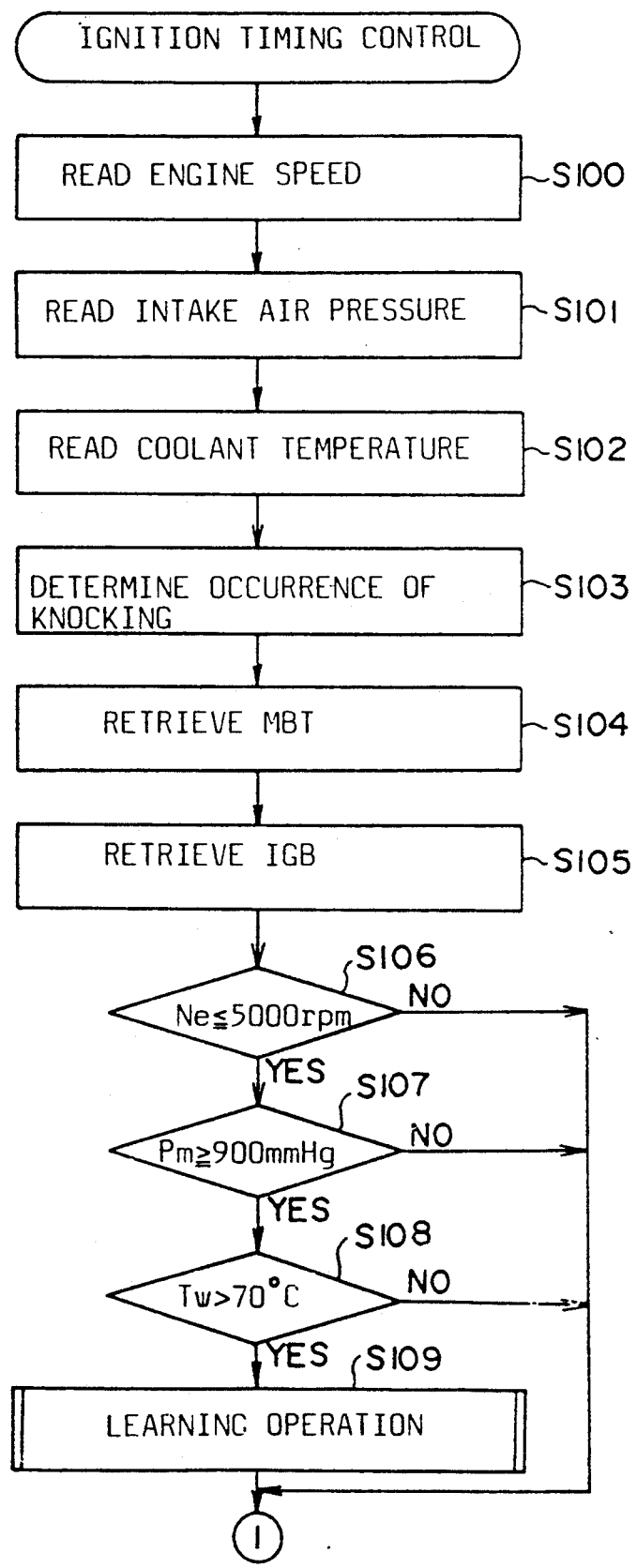

METHOD FOR CONTROLLING IGNITION TIMING OF AN INTERNAL COMBUSTION ENGINE

BACKGROUND OF THE INVENTION

The present invention relates to a method for controlling ignition timing of an internal combustion engine such as an automotive engine through a learning operation, and more particularly to the method for checking a learning correcting quantity of the learning operation at starting of the engine.

In a learning control system for correcting the ignition timing, a correcting quantity is gradually increased or decreased in accordance with an occurrence or absence of knocking. The correcting quantity is usually stored in a memory provided with a backup device so that when an ignition switch is turned on, proper ignition timing can be quickly determined by using the correcting quantity obtained through a learning operation before stopping the engine. Thereafter, when conditions for the learning operation are satisfied, the learning operation is continued to change the correcting quantity in an advance or a retard direction.

However, while the engine stops, the vehicle may be refueled with gasoline having a lower octane number than that used before stopping the engine. In such a case, the ignition timing must be greatly retarded when starting the engine. On the other hand, in a high engine speed range, since it is difficult to detect knocking because large mechanical oscillations generated in the engine are mixed with the knocking, the feedback correction and the learning correction are not performed. Therefore, if the engine speed is in a high engine speed range at starting the engine before the learning correction operation starts, the ignition timing is inevitably determined to be excessively advanced based on the learning correcting quantity for the high octane gasoline used before refueling. Furthermore, the ignition timing is kept advanced because the learning correction is not carried out in the high engine speed range. As a result, the occurrence of the knocking increases, which will cause damage to the engine. Thus, it is preferable to check whether the stored learning correcting quantity is appropriate for that at starting the engine or not.

Japanese Patent Application Laid-Open 61-164076 discloses a control system where correcting quantities dependent on a difference between a basic ignition timing and an actual ignition timing during the feedback operation are stored in a memory to correct the basic ignition timing while the feedback operation is stopped.

However, in the above-described system, the learning correcting quantity is not checked, so that the learning correcting quantity stored in the memory before the stopping of the engine is used in the high engine speed range after restarting the engine. Therefore, if the octane number of the gasoline changes when refueling, knocking frequently occurs until the learning correcting quantity is updated.

SUMMARY OF THE INVENTION

An object of the present invention is to provide a method for checking a learning correcting quantity at starting an engine so as to avoid occurrence of knocking despite a change in an octane number of gasoline.

According to the present invention, there is provided a method for controlling ignition timing of an internal combustion engine having an ignition timing control system for calculating ignition timing based on a basic ignition timing and a learning correcting quantity including a large correcting quantity and a small correcting quantity, wherein said quantities are stored in a backup memory in accordance with an occurrence of knocking of the engine, and a check mode control operation at starting the engine.

The check mode control operation comprises storing a temporary correcting quantity having a small value at starting the engine for calculating the ignition timing, increasing the temporary correcting quantity in an advance direction until knocking of the engine occurs, comparing the temporary correcting quantity with the large correcting quantity and determining a proper correcting quantity as a correcting quantity, and calculating the ignition timing based on a difference between said large and temporary correcting quantities.

In an aspect of the invention, the method comprises the steps of determining said difference based on the large correcting quantity when the difference between the large correcting quantity and the temporary correcting quantity is smaller than a predetermined value.

In another aspect of the invention, the method comprises the step of deciding said difference based on the temporary correcting quantity when the difference between the large correcting quantity and the temporary correcting quantity is within a predetermined range which is larger than said predetermined value.

The present invention further provides a system for controlling ignition timing of an internal combustion engine having an ignition timing control system for calculating an ignition timing based on a basic ignition timing and a learning correcting quantity including a large correcting quantity and a small correcting quantity, wherein said quantities are stored in a backup memory in accordance with occurrence of knocking of the engine.

The system comprises storing means for storing a temporary correcting quantity having a small value at starting the engine for calculating the ignition timing, means for increasing the temporary correcting quantity in an advance direction until knocking of the engine occurs, a comparator for comparing the temporary correcting quantity with the large correcting quantity and for determining a proper correcting quantity as a correcting quantity, and a calculator for calculating the ignition timing based on a difference between said large and temporary correcting quantities.

The other objects and features of this invention will become apparently understood from the following description with reference to the accompanying drawings.

BRIEF DESCRIPTION OF THE DRAWINGS

FIG. 1 is a schematic illustration of an engine to which the present invention is applied;

FIGS. 2a to 2e show a block diagram of a control system according to the present invention;

FIGS. 3a, 3b, 3c, 4a, 4b, 4c, 5a and 5b are flowcharts showing an operation of the system.

DETAILED DESCRIPTION OF THE PREFERRED EMBODIMENT

Figure 2A:
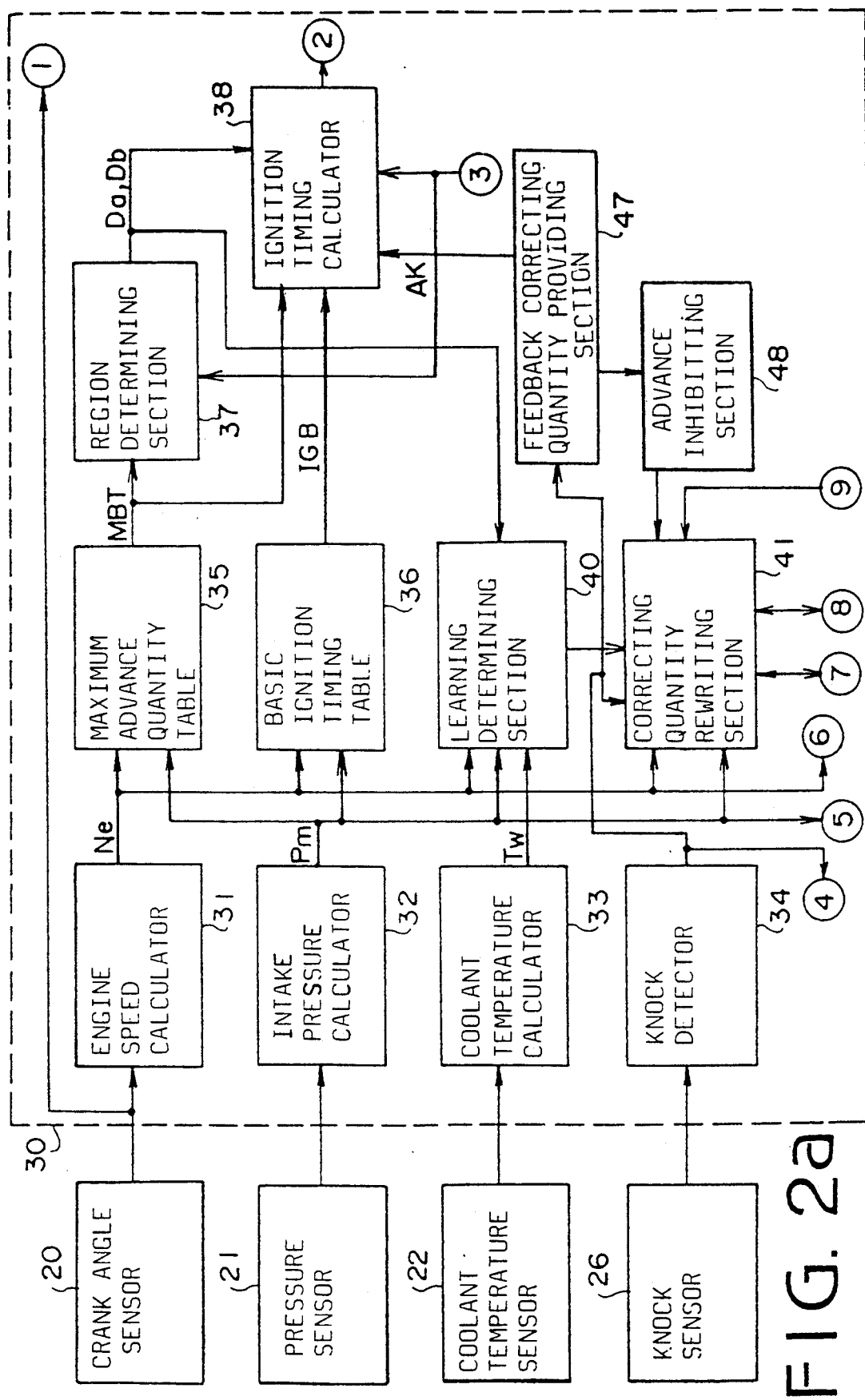
Figure 2B:
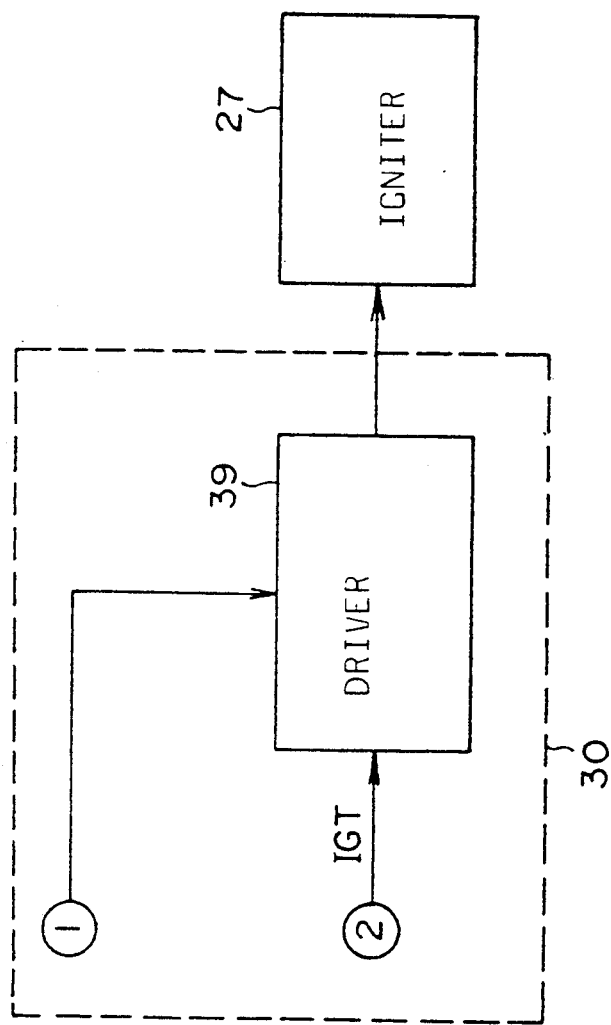
Figure 2C:
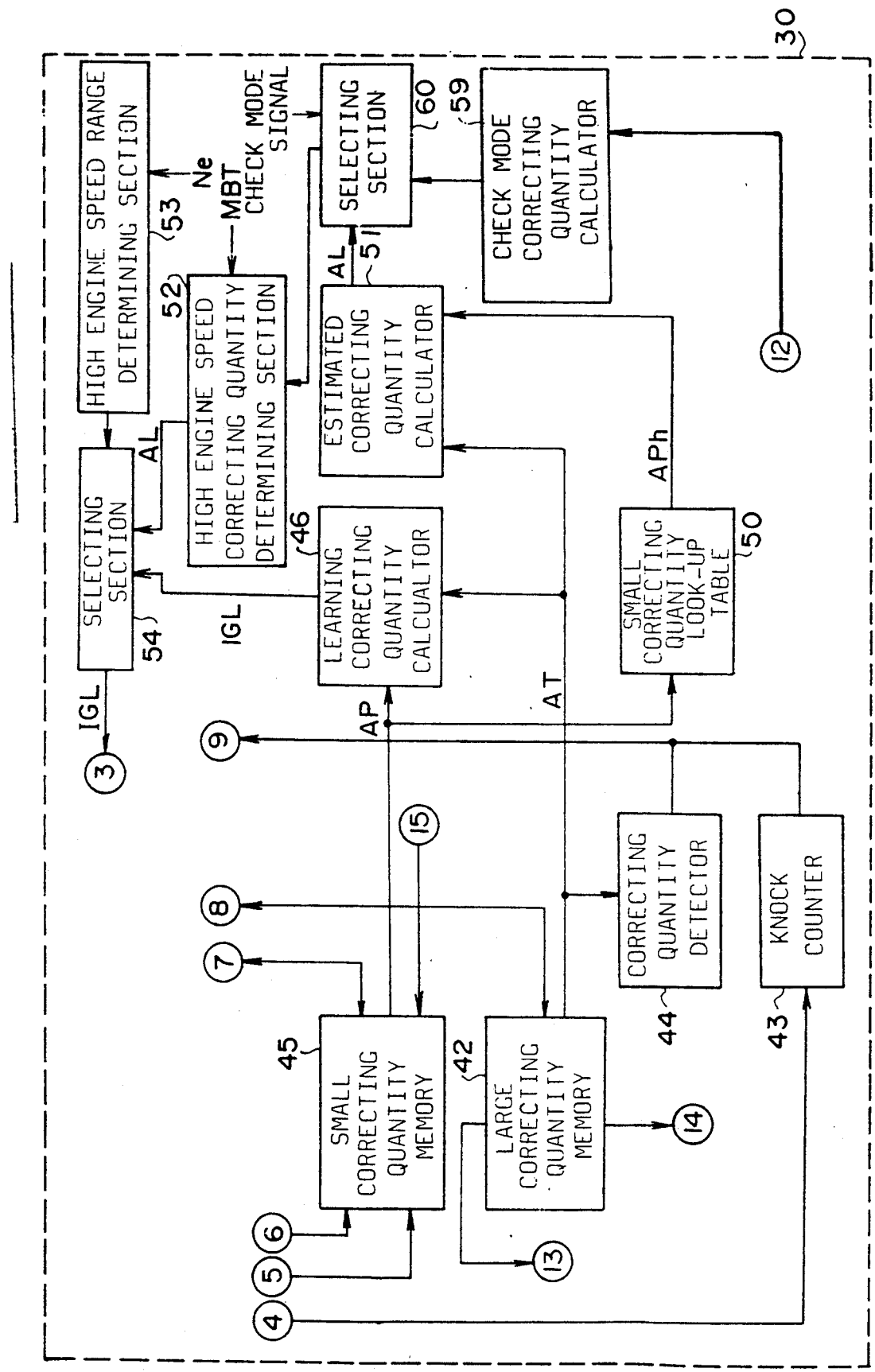

Referring to FIG. 1, an engine 1 has a throttle valve 10 provided in a throttle body 11 communicated with an air cleaner 8 through an intake pipe 9. The throttle body 11 is communicated with an intake manifold 12 which is communicated with a combustion chamber 2 of each cylinder in the engine 1 through an intake port 3 and an intake valve 4. A bypass 15 having an idle speed control (ISC) valve 14 is provided around the throttle valve 10. A spark plug 7 is located in each combustion chamber 2 and a multiple-point fuel injector 16 is provided in the intake manifold 12 adjacent each intake port 3. Exhaust gases of the engine 1 are discharged passing through an exhaust port 5, an exhaust valve 6 and an exhaust manifold 13. The engine 1 is provided with a crank angle sensor 20, a pressure sensor 21 for detecting pressure in the intake pipe 11 downstream of the throttle valve 10, a coolant temperature sensor 22, an intake air temperature sensor 23, an $O_2$-sensor 24 for detecting oxygen concentration of the exhaust gases in the exhaust manifold 13, a throttle position sensor 25, and a knock sensor 26. Output signals of the sensors 20 to 26 are applied to a control unit 30 which applies a fuel injection signal to the injector 16, an idle signal to the ISC valve 14 and an ignition signal to the spark plug 7 through an igniter 27, an ignition coil 28 and a distributor 29. Engine speed Ne is calculated based on the crank angle signal from the crank angle sensor 20 and intake pressure Pm as engine load is calculated based on the signal from the pressure sensor 21, which are used for calculating a basic injection pulse width Tp. The basic injection pulse width Tp is corrected in accordance with a coolant temperature Tw from the coolant temperature sensor 22, an intake air temperature Ta from the intake air temperature sensor 23 and a feedback signal from the $O_2$-sensor 24. The fuel injector 16 injects a quantity of fuel which corresponds to a corrected injection pulse width Ti.

On the other hand, engine idling is determined in accordance with throttle opening degree detected by the throttle position sensor 25, or with an on-signal of an idle switch. The opening degree of the ISC valve is adjusted to control the engine idling speed.

The control unit 30 is further fed with an ON-signal from an ignition switch 17 (FIG. 2d) in order to check a learning correcting quantity at the start of the engine.

Referring to FIGS. 2a to 2e, the control unit 30 has an engine speed calculator 31, an intake pressure calculator 32 and a coolant temperature calculator 33 for calculating the engine speed Ne, the intake pressure Pm and the coolant temperature Tw based on the output signals of the crank angle sensor 20, the pressure sensor 21 and the coolant temperature sensor 22, respectively. A knock detector 34 is provided to produce a knock signal when the knock sensor 26 detects knocking of the engine.

Figure 6:
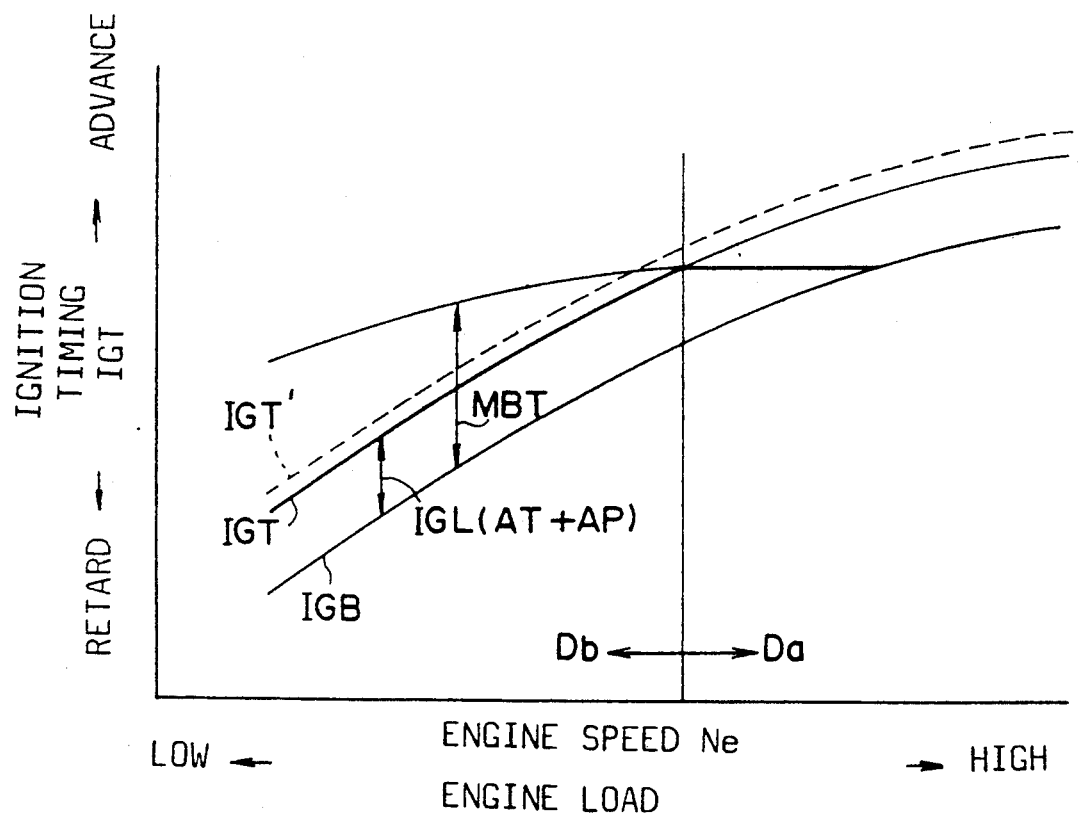
FIG. 6 is a graph showing characteristics of ignition timing and advance quantity in accordance with engine speed and engine load.

The engine speed Ne and the intake pressure Pm are fed to a basic ignition timing look-up table 36 and a maximum advance quantity look-up table 35. The basic ignition timing table 36 stores a plurality of basic ignition timings IGB, arranged in accordance with the engine speed Ne and the intake air pressure Pm. The basic ignition timing IGB is a maximum timing for producing maximum torque with low-octane gasoline without causing the knocking. The basic timing IGB advances with the increase of the engine speed Ne and the increase of the engine load represented by the intake air pressure Pm as shown in FIG. 6. The maximum advance quantity table 35 stores a plurality of maximum advance quantities MBT, arranged in accordance with engine speed Ne and intake pressure Pm. The maximum advance quantity MBT is a value to be added to the basic ignition timing to obtain the maximum torque with high-octane gasoline without causing knocking A maximum ignition timing IGT' for obtaining the maximum torque is shifted in parallel in the advancing direction with an increase in the octane number of the fuel.

The maximum advance quantity MBT, a learning correcting quantity IGL obtained through the learning procedure and a knocking feedback correcting quantity AK obtained through the feedback procedure, the operations of which will be later described, are fed to a region determining section 37. In the determining section 37, the maximum advance quantity MBT and the learning correcting quantity IGL are compared with one another to select one of the regions Da and Db shown in FIG. 6. When the maximum advance quantity MBT is smaller than the sum of the correcting quantity IGL and the knocking feedback correcting quantity AK ($MBT \leq IGL + AK$), the region Da is selected, where the maximum advance quantity MBT is used for obtaining the ignition timing. To the contrary, when the maximum advance quantity MBT is larger than the sum of the learning correcting quantity IGL and knocking feedback correcting quantity AK (MT > IGL + AK), the region Db is selected, where the correcting quantity IGL is derived.

The output signal of the region determining section 37, the maximum advance quantity MBT and the basic ignition timing IGB, the learning correcting quantity IGL and the knocking feedback correcting quantity AK are fed to an ignition timing calculator 38. When the region Db is selected, a learning correcting quantity IGL is derived to advance the basic ignition timing IGB. The ignition timing IGT is calculated as follows.

$$IGT = IGB + IGL + AK$$

On the other hand, in the region Da, the basic ignition timing IGB is advanced by the maximum advance quantity MBT so that the ignition timing IGT is calculated as follows.

$$IGT = IGB + MBT$$

The ignition timing IGT is applied to the igniter 27 through a driver 39 so as to ignite the spark plug at the calculated timing IGT in accordance with the crank angle signal.

The control unit 30 further has a system for obtaining the learning correcting quantity IGL through learning. A learning determining section 40 is applied with the output signal of the region determining section 37, the engine speed Ne, the intake pressure Pm and the coolant temperature Tw to determine whether the engine operating conditions are proper for performing the learning operation. The learning operation is executed when the vehicle is driven in a warmed up state in a high engine load range and the low engine speed range where the knocking can be accurately detected, and when the Db range is selected. The output signal of the determining section 40 is applied to an ignition timing correcting quantity rewriting section 41 to which the engine speed Ne, the intake pressure Pm and the knock signal are further fed. The correcting quantity rewriting section 41 selectively performs an entire rough correcting operation with a large correcting quantity and an individual fine correcting operation with a small correcting quantity in accordance with the engine operating conditions. The large learning correcting quantity AT stored in a large correcting quantity memory 42 (backup memory) is rewritten dependent on the knock signal from the knock detector 34. When the knocking does not occur, the learning is performed once every predetermined period t1, for example, 1 second, to increase the large learning correcting quantity AT by a predetermined value a, thereby changing the large learning correcting quantity in the advance direction. On the other hand the correcting quantity AT is decreased by a predetermined value $\gamma$ at every time when the knocking occurs. A knock counter 43 is fed with the knock signal to count the occurrence of the knocking. When the knocking counts up to a predetermined number $\alpha$, for example five times, the knock counter 43 produces an output signal which is applied to the correcting quantity rewriting section 41. A correcting quantity detector 44 is fed with a correcting quantity AT derived from the memory 42 to compare the quantity with a predetermined maximum advance quantity AM. When the correcting quantity AT reaches the maximum advance quantity AM, a signal is fed to the rewriting section 41. The rewriting section 41 stops the rough correction when either of the signals from the counter 43 or the detector 44 is fed, estimating that the ignition timing IGT has approached the desired maximum timing IGT'.

A fine correcting operation is carried out thereafter. A small learning correcting quantity AP is read out from a small correcting quantity memory 45 (backup memory) storing a plurality of a small learning correcting quantities AP which are arranged in accordance with the engine operating conditions. The small learning correcting quantity AP is similarly increased or decreased by learning in the rewriting section 41 in dependency on the occurrence of the knocking. Thus, the ignition timing IGT is further advanced to approach the desired maximum timing IGT'. The large correcting quantity memory 42 and the small correcting quantity memory 45 are each provided with a backup device so as to hold the correcting quantities AT and AP in the memories 42 and 45 even while the ignition switch 17 is off.

The large learning correcting quantity AT and the small learning correcting quantity AP are fed to a learning correcting quantity calculator 46 where the learning correcting quantity IGL is calculated as follows.

$$IGL = AT + AP$$

The learning correcting quantity IGL is fed to the ignition timing calculator 38 as described hereinbefore.

The control unit 30 of the present invention is further provided with a knocking feedback control system. The knock signal from the knock detector 34 is fed to a feedback correcting quantity providing section 47 where the knocking feedback correcting quantity AK is provided. When a knocking occurs, the correcting quantity AK is decreased by a predetermined retard value $\gamma_F$, which is several times larger than the value $\gamma$ of the learning correcting quantities AT and AP, so as to retard the ignition timing IGT. When the knocking is suppressed, a predetermined small advance value $a_F$ which is substantially the same value as the value a for the learning correction is provided. The feedback correcting quantity AK is fed to the ignition timing calculator 38 to correct the basic ignition timing as hereinbefore explained.

In order to determine the ignition timing in a high engine speed range, the control unit 30 is provided with a selecting means 50 for the high speed range, which selects one of small learning correcting quantities $AP_l$ to $AP_m$ stored in the small correcting quantity memory 45, arranged in accordance with the engine speed Ne and the intake pressure Pm. Therefore one of the small correcting quantities APh in a higher speed range of the present intake pressure $P_m$ is selected by the selecting means 50.

The selected small correcting quantity APh and the large correcting quantity AT from the large correcting quantity memory 42 are applied to an estimated correcting quantity calculator 51 where an estimated correcting quantity AL is calculated as follows.

$$AL = AT + APh - K$$

where K is a constant larger than zero ($K \leq 0$). The estimated correcting quantity AL is fed to a selecting section 60 to which a check mode correcting quantity AL' which will be later described is applied. During the normal learning operation, the selecting section 60 selects the estimated correcting quantity AL, thereby applying the estimated correcting quantity AL to a high engine speed correcting quantity determining section 52 where the estimated correcting quantity AL is compared with the maximum advance quantity MBT. When the estimated correcting quantity AL is smaller than the advance quantity MBT (AL<MBT), the estimated quantity AL is fed to a selecting section 54 to which the learning correcting quantity IGL is fed.

A high engine speed range determining section 53 produces an output signal when the engine speed Ne is higher than a predetermined value such as 5000 rpm, determining that the engine 1 is in a high engine speed range where the knocking cannot be detected. When the output signal of the high engine speed range determining section 53 is applied, the selecting section 54 feeds the high engine speed range correcting quantity AL to the ignition timing calculator 38, thereby calculating the real ignition timing IGT in dependency on, $$IGT = IGB + AL + AK$$

The control unit 30 has a system for checking the learning correcting quantity. The output signal of the ignition switch 17 is applied to a check mode determining section 56 to determine a check mode when the ignition switch 17 is turned on. A latch section 55 is provided to temporarily store a large learning correcting quantity ATC (temporary correcting quantity) for the check mode. The output signal of the check mode determining section 56 is fed to the correcting quantity rewriting section 41. When the learning correcting condition is determined in the check mode, the rewriting section 41 operates to increase the initial large correcting quantity ATC stored in the latch section 55 the value of which is zero in the advancing direction. The rewritten large correcting quantity ATC is compared by a comparator 57 with the large correcting quantity ATM obtained through the learning operation and stored in the large correcting quantity table 42 before the engine 1 stops. When the large correcting quantity ATC becomes equal to the large correction quantity ATM while the engine is operated without knocking, the check mode is completed so that the correcting quantity rewriting section 41 resumes the normal learning operation.

When a knocking occurs in the check mode, the comparator 57 further compares the difference between the large correcting quantities ATM and ATC with a predetermined small reference value $\Delta\gamma_1$, for example, 2° CA, and with a predetermined large reference value $\Delta\gamma_2$, for example 6° CA. When the difference ATM-ATC is smaller than the reference value $\Delta\gamma_1$, it is determined that the large correcting quantity ATM stored in the large correcting quantity memory 42 is appropriate, thereby maintaining the large correcting quantity ATM as the large correcting quantity AT for calculating the ignition timing IGT. When the difference ATM-ATC is between the two reference values $\Delta\gamma_1$ and $\Delta\gamma_2$, it is determined that the large correcting quantity ATC stored in the latch section 55 is preferable as the correcting quantity AT so that the correcting quantity ATM stored in the memory 42 is rewritten with the large correcting quantity ATC. If the difference is larger than the reference value $\Delta\gamma_2$, it is determined that the large correcting quantity ATM stored in the memory 42 is improper. The comparator 57 feeds a signal to a learning correcting quantities initializing section 58 which in turn applies signals to the large correcting quantity memory 42 and the small correcting quantity memory 45 to clear both correcting quantities ATM and AP. Thus, the afore-described rough learning operation is recovered.

The large correcting quantity ATC stored in the latch section 55 is further fed to a check mode correcting quantity calculator 59 for determining the ignition timing IGT while the engine 1 is operated at a high speed during the check mode. The calculator 59 calculates the check mode correcting quantity AL' based on the large correcting quantity ATC as follows.

$$AL' = ATC-K \quad (K \geq 0)$$

The check mode correcting quantity AL' and the estimated correcting quantity AL calculated in the estimated correcting quantity calculator 51 are fed to the selecting section 60 to which a check mode signal from the check mode determining section 56 is fed. When the check mode signal is applied, the selecting section 60 applies the check mode correcting quantity AL' instead of the estimated correcting quantity AL to the high engine speed range correcting quantity determining section 52. Thus, the ignition timing IGT during the check mode can be estimated based on the large correcting quantity AT obtained through the learning operation.

Figure 3B:
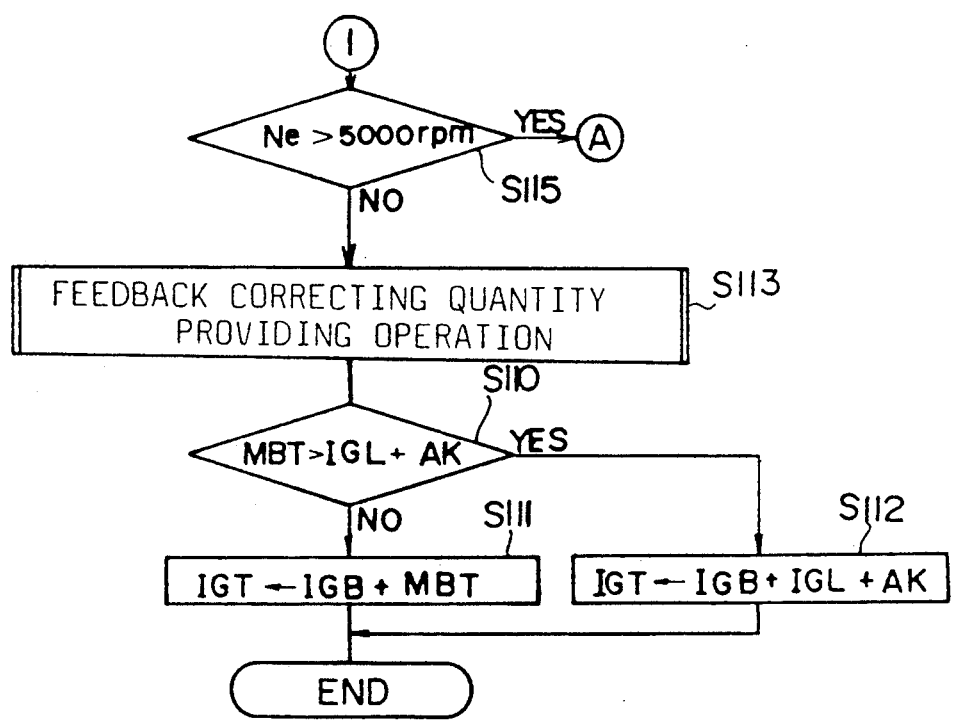
Figure 3C:
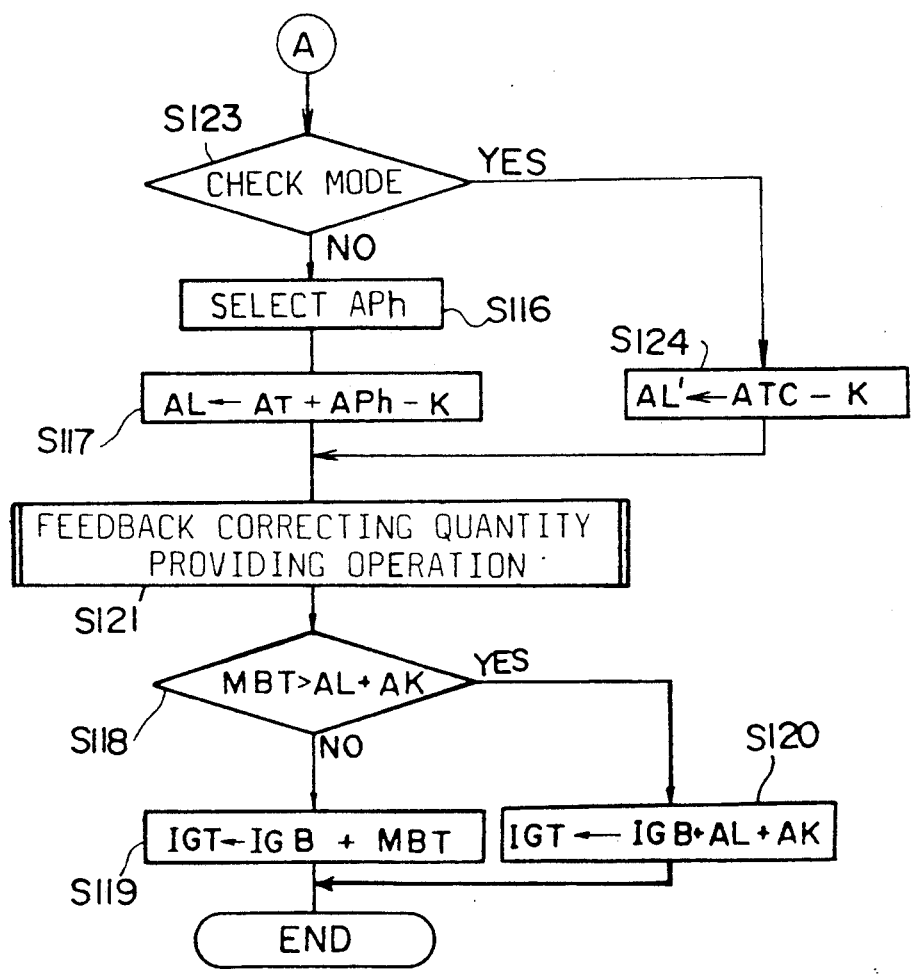
Figure 4A:
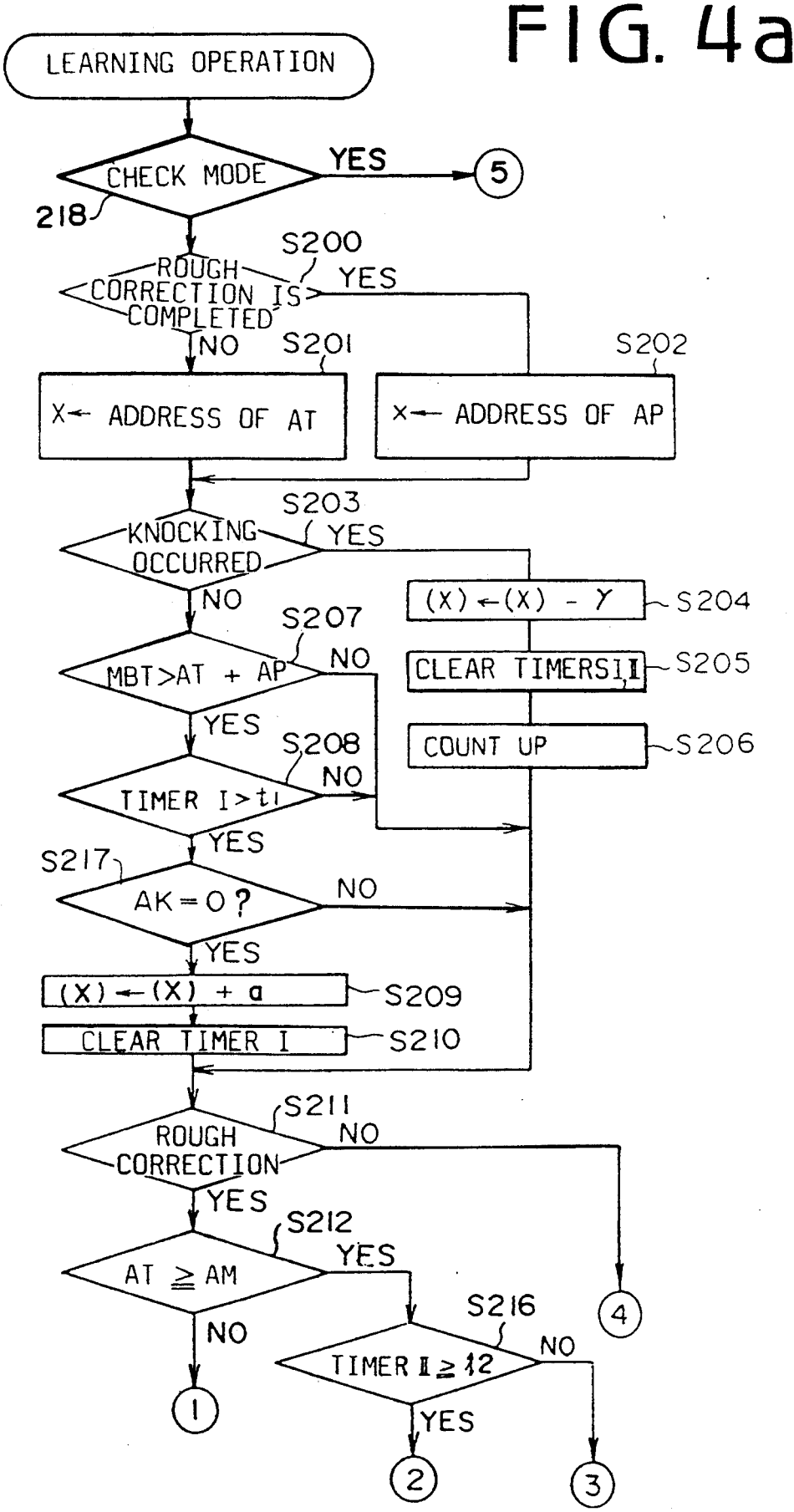
Figure 4B:
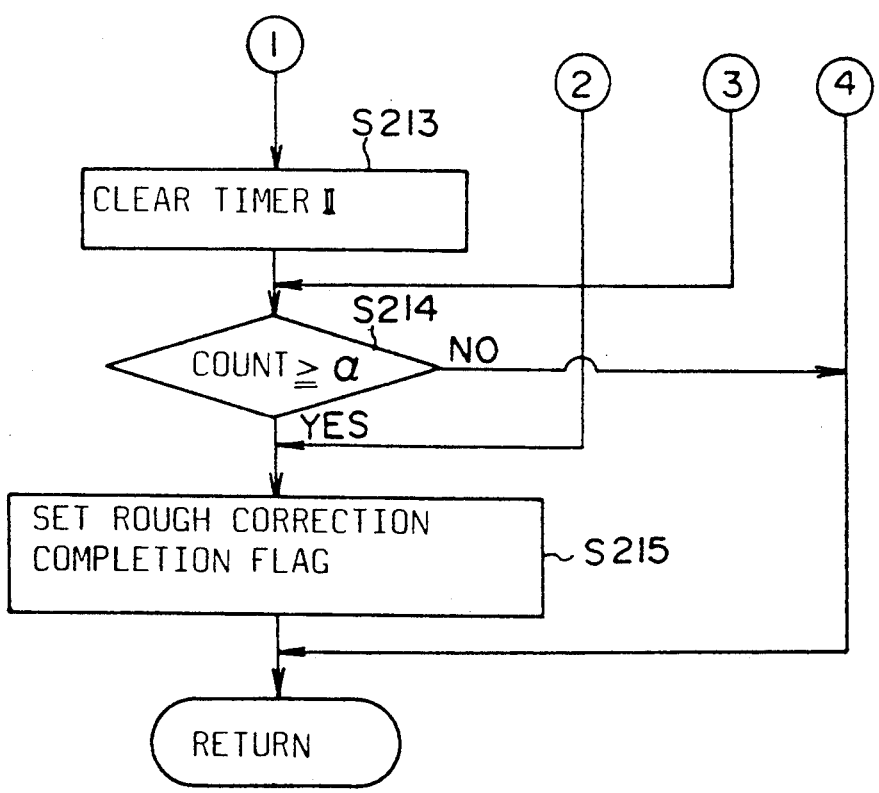
Figure 4C:
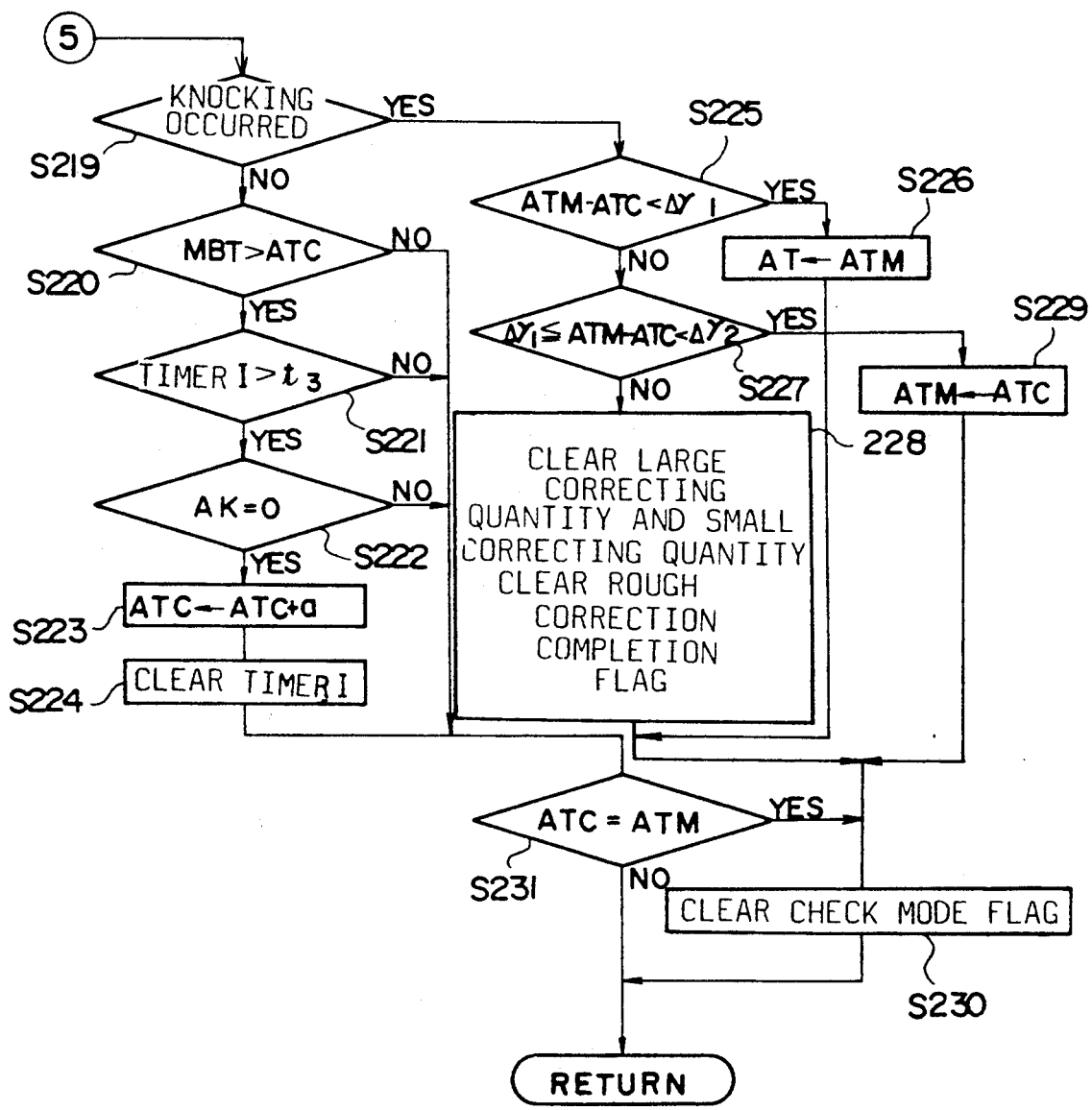

FIGS. 3a to 3c show the operation of the system in summary. When the program starts, the engine speed Ne, the intake air pressure Pm and the coolant temperature Tw are read out at steps S100 to S102. At a step S103, the occurrence of the knocking is detected. Thereafter, at steps S104 and S105, the maximum advance quantity MBT and the basic ignition timing IGB are read out from the respective tables 35 and 36 in accordance with the engine speed Ne and the intake air pressure Pm. Steps S106 to S108 determine whether conditions for the learning are fulfilled. More particularly, improper conditions for learning, such as in a cold state, or in the high engine speed range where the knock signal is liable to contain noises or in the low engine load range where the output of the sensors are low, are omitted at these steps. That is, it is determined whether the engine speed Ne is smaller than 5000 rpm (Ne $\leq$ 5000 rpm), the intake pressure Pm is higher than 900 mmHg (Pm $\geq$ 900 mmHg) and whether the coolant temperature Tw is higher than 70° C. (Tw>70° C.). When all of the answers at the steps S106 to S108 are YES, the program goes to a step S109 for the learning operation which is described in FIGS. 4a and 4b.

In the operation besides the check mode operation, the program proceeds from a step S218 to a step S200. The step S200 determines whether the entire rough learning correction is completed. When the rough learning correction is not completed, an address of the large learning correcting quantity AT in the memory 42 is stored in an index register X at a step S201. The program proceeds to a step S203 where it is determined whether a knocking has occurred during the program. When the occurrence of the knocking is determined, the program proceeds to a step S204, and if not, proceeds to a step S207. At the step S204, all of the large learning correcting quantities AT are decremented by the correcting quantity $\gamma$ (the predetermined value). Timers I and II are cleared at a step S205 and the counter 43 counts up the occurrence of the knocking at a step S206.

On the other hand, at the step S207, the maximum advance quantity MBT is compared with the corresponding learning correcting quantity IGL (AT+AP). When the maximum advance quantity MBT is smaller than the correcting quantity IGL, the learning operation is terminated, since the correcting quantity IGL exceeds the limit advance quantity MBT. At a step S208, the timer I for measuring the period during which knocking does not occur is checked to determine whether the engine 1 has operated without causing knocking for the predetermined period t1 (for example 1 second). If the present time is within the period t1, the learning is not executed. When the knocking has not occurred for the period t1, a step S217 determines whether the feedback correcting quantity AK is zero or not. When the feedback correcting quantity AK is zero, the correcting quantities AT are incremented by the quantity a at a step S209, and the timer I is cleared at a step S210.

The following steps S211 to S215 are provided for determining the completion of the large learning correction. At a step S211, it is determined whether the rough correction is still being carried out. When the corresponding correcting quantity AT is smaller than the predetermined maximum advance quantity AM (step S212), the timer II is cleared at a step S213. At a step S214, it is determined that the rough correction is completed when the knocking has occurred more than the predetermined number $\alpha$ (for example 5 occurrences) so that a rough correcting completion flag is set at a step S215.

When the large learning correcting quantity AT reaches the predetermined maximum quantity AM (step S212), it is determined at a step S216 whether a predetermined period t2, for example 3 seconds, has passed since the start of the rough correction. The program is repeated to continue the rough correction when the predetermined period has not passed. When the period has passed, the program proceeds to the step S215.

When the rough learning correcting operation is completed, the program goes to a step S202 from the step S200 where an address of the small correcting quantity AP is stored in the index register X. Thereafter, steps similar to the steps S203 to S210 are carried out. Namely, when a knocking occurs, a corresponding small learning correcting quantity AP is decreased by a predetermined small value. To the contrary, when the knocking does not occur, the small correcting quantity AP is increased once at every period t1 to advance the timing. When it is determined at the step S211 that the fine correction is being carried out, the program is repeated as long as the conditions for the learning are satisfied.

Figure 5A:
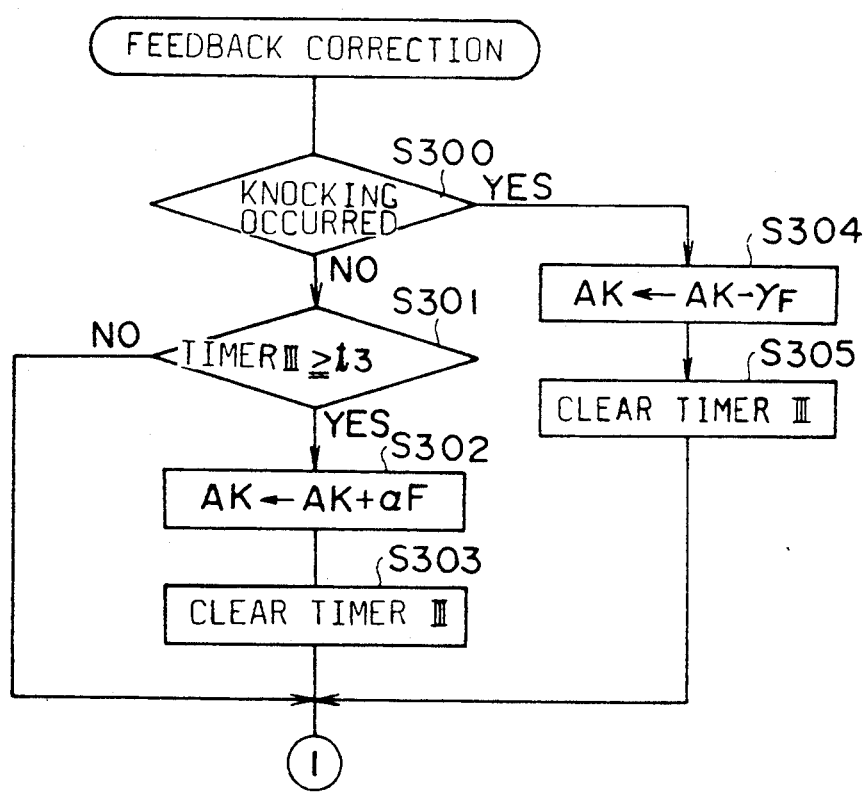
Figure 5B:
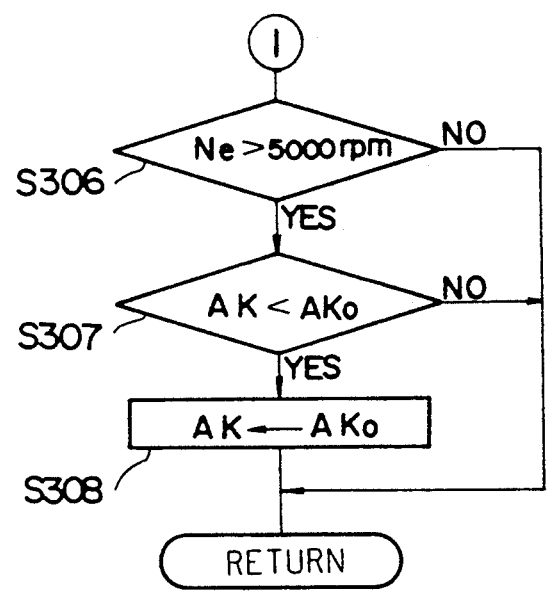

During the fine correction, the program shown in FIGS. 3a and 3b proceeds to a step S113 to execute the feedback correction which are described in FIGS. 5a and 5b.

Thereafter, the program proceeds to a step S110 where it is determined whether the maximum advance quantity MBT is larger than the sum of the correcting quantity IGL, which is the sum of the large correcting quantity AT and the small correcting quantity AP, and the feedback correcting quantity AK. When the MBT is smaller than $IGL+AK$ ($MBT \leq IGL+AK$), the program goes to a step S111 to calculate the ignition timing IGT by advancing the basic injection timing IGB with the maximum advance quantity MBT. To the contrary, if the MBT is larger than the $IGL+AK$ ($MBT > IGL+AK$), the ignition timing IGT is determined by advancing the basic timing IGB with the correcting quantity IGL plus AK at a step S112. Thus, the ignition timing IGT close to the desired maximum timing IGT' can be obtained as shown by a bold line in FIG. 6.

The operation of the feedback correction at the step S113 is described hereinafter with reference to FIGS. 5a and 5b. When a knocking occurs (step S300), the program goes to a step S304 so that the feedback correcting quantity AK is decreased by the large value $\gamma_F$ and a timer III is cleared at a step S305 if there is no occurrence of knocking for a period. At the same time, since the fine correction is being carried out, the small correcting quantity AP is decreased by the value $\gamma$ at the step S204 in FIG. 4a, thereby decreasing the learning correcting quantity IGL. The ignition timing IGT is therefore greatly retarded by the correcting quantities IGL and AK.

If it is determined at the step S300 that the knocking did not occur thereafter, the program goes to a step S301 where the timer III is checked to determine whether the knocking does not occur for a predetermined period $t_3$. At a step S302, the feedback correcting quantity AK is increased by the value $a_F$ and the timer III is cleared at a step S303. On the other hand, in the fine correction operation shown in FIG. 4a, since it is determined at the step S217 that the feedback correcting quantity AK does not reach zero, the program goes to the step S211 without increasing the small correcting quantity AP. Hence the learning correcting quantity IGL stays constant. Thus, when the knocking does not occur, the feedback correcting quantity AK is increased to advance the timing. When the correcting quantity AK becomes zero, the learning correcting quantity IGL is increased. Since only one of the feedback correcting quantity AK and the learning correcting quantity IGL is used, the fluctuation of the ignition timing IGT is avoided.

In the high engine speed range where the engine speed Ne is higher than 5000 rpm (Ne>5000 rpm), the program shown in FIGS. 3a to 3c goes from the step S106 to a step S115, thereby discontinuing the learning operation. The program further proceeds to a step S213 where the check mode is determined. During the normal learning operation, the program goes to a step S116 where a small correcting quantity APh is selected from a plurality of the small learning correcting quantities AP corresponding to the intake pressure Pm. At a step S117, an estimated correcting quantity AL is calculated based on the selected small correcting quantity APh and the large learning correcting quantity AT. The feedback correcting quantity AK is determined at a step S121 and the maximum advance quantity MBT is compared with the sum of the estimated correcting quantity AL and the feedback correcting quantity AK at a step S118. When the MBT is smaller than the sum $AL+AK$, the program goes to a step S119 so that the ignition timing IGT is calculated based on the basic ignition timing IGB and the maximum advance quantity MBT. When the sum $AL+AK$ is smaller than the maximum advance quantity MBT, the ignition timing IGT is calculated at a step S120 based on the basic ignition timing IGB and the correcting quantities AL and AK. The ignition timing IGT in the high engine speed range thus corresponds to that of the high engine speed at each intake pressure Pm so that the ignition timing IGT is sufficiently advanced without causing knocking.

If a knocking occurs even in the high engine speed range, the feedback correcting quantity providing operation is carried out at the step S121 in the same manner as at the step S113 which is shown in FIG. 3b, thereby retarding the ignition timing IGT. If the engine speed Ne is higher than 5000 rpm, a step S306 determines the high engine speed range so that the program goes to a step S307 where the calculated feedback correcting quantity AK is compared with a predetermined value $AK_O$. When the feedback correcting quantity AK is smaller than the value $AK_O$, the value $AK_O$ is selected as the feedback correcting quantity AK. Therefore, the ignition timing IGT is prevented from being erroneously retarded when a mechanical noise is detected as a knocking signal.

The check mode operation, which is performed when the engine 1 is restarted, will be described hereinafter. When the ignition switch 17 is turned on and the engine 1 is operated under conditions for the learning operation, the check mode is determined at the step S218 in FIG. 4a. The program proceeds to a step S219 to determine whether knocking occurred or not. If knocking does not occur, it is determined whether the large correcting quantity ATC is smaller than the maximum advance quantity MBT (step S220), the predetermined period t3 passed since the last knocking (step S221), and the feedback correcting quantity AK is zero (S222). When all the conditions are satisfied, the initial large correcting quantity ATC, which is zero, is increased by the value a at a step S223. The learning operation is repeated until it is determined at a step S231 that the large correcting quantity ATC reaches the value of the large correcting quantity ATM stored in the large correcting quantity memory 42. Thus, it is determined that the octane number of the gasoline did not change while the engine was stopped. Thereafter, a check mode flag is cleared at a step S230 to terminate the check mode operation. The program proceeds to the step S200 from the step S218 to execute the normal learning operation using the stored learning large correcting quantity ATM.

When one knocking occurs during the check mode operation, the difference (ATM-ATC) between the large correcting quantities ATM and ATC is compared with the reference values $\Delta\gamma_1$ and $\Delta\gamma_2$ at steps S225 and S227. When the step S225 determines that the difference is smaller than the reference value $\Delta\gamma_1$ ((ATM-ATC)<$\Delta\gamma_1$), it is determined that the correcting quantity ATM is appropriate. The program goes to a step S226 where the large correcting quantity ATM stored in the large correcting quantity memory 42 is kept. When the difference (ATM-ATC) is between the reference values $\Delta\gamma_1$ and $\Delta\gamma_2$ ($\Delta\gamma_1 \leq$ (ATM-ATC$<\Delta\gamma_2$), the large correcting quantity ATM is rewritten with the large correcting quantity ATC at a step S229. When the difference is larger than the reference value $\Delta\gamma_2$ (ATM-ATC)$\geq \Delta\gamma_2$), it is determined that fuel is changed. The program proceeds to a step S228 where the rough correction completion flag is cleared so that the operation returns to the rough correction operation. Thus, the large correcting quantity ATM is easily and quickly checked at the occurrence of the knocking, thereby preventing the use of inappropriate stored large correcting quantity ATM.

If the engine speed Ne becomes high during the check mode operation, the program shown in FIGS. 3b to 3c proceeds from the step S115 to the step S123, thereby stopping the check mode operation. At a step S124, the check mode correcting quantity AL' is calculated by subtracting the constant K from the large correcting quantity ATC. The ignition timing IGT is retarded accordingly. In particular, when the engine speed Ne rapidly increases, the ignition timing IGT is sufficiently retarded. Consequently even if the octane number of the gasoline changes, the knocking is avoided as the ignition timing IGT is retarded.

In accordance with the present invention, at starting of the engine 1, the learning correcting quantity which is stored in the memory is checked prior to the learning operation. Therefore, if the octane number of the gasoline used in the engine changes, the ignition timing IGT is controlled without causing knocking. Thus the response of the ignition timing control system with respect to the change in the octane number is improved. In addition, when the engine speed Ne increases during the check mode operation, the ignition timing is estimated based on the learning correcting quantity obtained during the checking. Therefore, even though the octane number of the gasoline decreases after stopping the engine, the knocking is avoided, thereby ensuring durability and safety of the engine. When the knocking occurs, the engine operating conditions are divided into three states by the checking so as to use an appropriate correcting quantity for each state.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A method for controlling ignition timing of an internal combustion engine having an ignition timing control system for calculating an ignition timing based on a basic ignition timing and a learning correcting quantity including a large correcting quantity and a small correcting quantity, wherein said quantities are stored in a backup memory in accordance with an occurrence of knocking of the engine, the method comprising the steps of:

storing a temporary correcting quantity having a small value at starting the engine for calculating the ignition timing;

increasing the temporary correcting quantity in an advance direction until knocking of the engine occurs;

comparing the temporary correcting quantity with the large correcting quantity and determining a proper correcting quantity as a correcting quantity; and calculating the ignition timing based on a difference between said large and temporary correcting quantities.

2. The method according to claim 1, further comprising the step of determining said difference based on the large correcting quantity when the difference between the large correcting quantity and the temporary correcting quantity is smaller than a predetermined value.

3. The method according to claim 2, further comprising the step of deciding said difference based on the temporary correcting quantity when the difference between the large correcting quantity and the temporary correcting quantity is within a predetermined range which is larger than said predetermined value.

4. The method according to claim 3, further comprising correcting said difference based on a correcting quantity which is smaller than the large correcting quantity when the difference between the large correcting quantity and the temporary correcting quantity is larger than said range.

5. The method according to claim 1, further comprising:

stopping the comparison when engine speed is higher than a predetermined high speed; and calculating the ignition timing based on the temporary correcting quantity at that time.

6. A system for controlling ignition timing of an internal combustion engine having an ignition timing control system for calculating an ignition timing based on a basic ignition timing and a learning correcting quantity including a large correcting quantity and a small correcting quantity, wherein said quantities are stored in a backup memory in accordance with occurrence of knocking of the engine, the system comprising:

storing means for storing a temporary correcting quantity having a small value at starting the engine for calculating the ignition timing;

means for increasing the temporary correcting quantity in an advance direction until knocking of the engine occurs;

a comparator for comparing the temporary correcting quantity with the large correcting quantity and for determining a proper correcting the quantity as a correcting quantity; and a calculator for calculating the ignition timing based on a difference between said large and temporary correcting quantities.

* * * * *